United States Patent
McGovern et al.

(10) Patent No.: US 9,886,287 B2
(45) Date of Patent: Feb. 6, 2018

(54) ADAPTIVE DEVICE DRIVER METHOD AND SYSTEM

(71) Applicant: NetApp, Inc., Sunnyvale, CA (US)

(72) Inventors: William McGovern, Sunnyvale, CA (US); Josh Silberman, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/865,237

(22) Filed: Sep. 25, 2015

(65) Prior Publication Data
US 2016/0011886 A1    Jan. 14, 2016

Related U.S. Application Data

(63) Continuation of application No. 12/620,472, filed on Nov. 17, 2009, now Pat. No. 9,158,552.

(51) Int. Cl.
*G06F 3/00* (2006.01)
*G06F 9/44* (2006.01)

(52) U.S. Cl.
CPC .................................. *G06F 9/4415* (2013.01)

(58) Field of Classification Search
None
See application file for complete search history.

(56) References Cited

U.S. PATENT DOCUMENTS

| | | | | |
|---|---|---|---|---|
| 2003/0200532 A1* | 10/2003 | Gensel | .................. | G06F 8/71 717/120 |
| 2004/0205778 A1* | 10/2004 | Wong | .................. | G06F 9/4413 719/321 |
| 2005/0034135 A1 | 2/2005 | Warwick et al. | | |
| 2006/0221372 A1* | 10/2006 | Onishi | .................. | G06F 3/1204 358/1.13 |
| 2007/0016913 A1* | 1/2007 | Ibrahim | .................. | G06F 9/4411 719/321 |

* cited by examiner

*Primary Examiner* — Sisley Kim
(74) *Attorney, Agent, or Firm* — LeClairRyan, a Professional Corporation

(57) ABSTRACT

Aspects of the present invention provide a method of specifying a device driver design for a board device. The method includes receiving a board device with various functional elements and on-board storage to be operatively coupled to a computing device through an interconnect. The device driver design is specified through the identification of one or more device driver parameters. The device driver parameters are to be used subsequently to customize an adaptive device driver that interfaces with the board device and each of the one or more functional elements. Device driver parameters are stored in a predetermined storage construct allocated from the board device. These device driver parameters remain stored in the storage construct until there is a need for the board device and corresponding device driver. Customizing the adaptive device driver is done after the device driver parameters have been stored and typically when a computer device starts or 'boots". Initially, aspects of the present invention may receive an indication that a board device and one or more functional elements associated with the board device have been attached to an interconnect and requires a device driver. Next, aspect of the present invention retrieve device driver parameters from the storage constructs and customizes the adaptable device driver into a device driver for the board device in accordance with the device driver parameters.

18 Claims, 5 Drawing Sheets

ADAPTIVE DEVICE DRIVER METHOD AND SYSTEM

This application is a continuation, of prior U.S. patent application Ser. No. 12/620,472, filed Nov. 17, 2009, which is herein incorporated by reference.

INTRODUCTION

Device drivers enable operating systems and applications to communicate with hardware devices. In the conventional approach, a customized device driver is developed from scratch to fit the specific hardware design once the hardware implementation is complete. The device driver is generally a monolithic software solution that configures and controls many different functions made available in the hardware design. Some of the device driver functions may include a flash memory controller, serial interface, thermostatic control and direct memory access (DMA) controller. Full development and testing of the device driver tends to be time consuming for even the most skilled developer as hardware solutions tend to be complex and have many requirements to operate properly. Moreover, the software must be written specifically for each hardware device and the particular combination of functions on the hardware.

Advances in technology have reduced the time and cost for developing hardware solutions. Rapid prototyping and development is now possible using semi-custom chip designs and reuse of certain hardware cores. Hardware costs may also be reduced using field programmable gate arrays (FPGAs) that allow semi-custom development and test of a design without the overhead of custom fabrication and foundries. For example, an FPGA device may initially be 'programmed' to perform one particular set of tasks and, if necessary, may be reprogrammed to perform a new set of tasks. Hardware costs have also been contained through the much larger volume of hardware being manufactured and the corresponding decrease in unit costs.

In contrast, there are few developments to help expedite the development of device drivers for hardware. Currently, a device driver cannot be created in parallel with the hardware design as the exact features and interface may change. Even when the hardware is completed, software developers must extract details of the hardware design from manuals and sometimes directly from the hardware designers.

Added delays in developing the device driver may occur if critical features are not documented or hard to find. Moreover, improperly documented features may result in extensive testing to identify device driver operating anomalies (i.e., "bugs"); extensive rewriting of the drivers to eliminate these problems only increases the cost and time to completion. Serializing device driver development after the hardware design increases the time and cost to develop a solution and decreases the influence software developers might have over hardware designs. In general, there is a need to improve the overall process of developing hardware and corresponding device drivers in a cost-effective and timely manner.

BRIEF DESCRIPTION OF THE DRAWINGS

The features of the present invention and the manner of attaining them, and the invention itself, will be best understood by reference to the following detailed description of embodiments of the invention, taken in conjunction with the accompanying drawings, wherein.

SUMMARY

Aspects of the present invention provide a method of specifying a device driver design for a board device. The method includes receiving a board device with various functional elements to be operatively coupled to a computing device through an interconnect. The device driver design is specified through the identification of one or more device driver parameters. The device driver parameters are to be used subsequently to customize an adaptive device driver that interfaces with the board device and each of the one or more functional elements. Device driver parameters are stored in a predetermined storage construct allocated from on-board storage on the board device. These device driver parameters remain stored in the storage construct until there is a need for a device driver to interface with the board device. Customizing the adaptive device driver is done after the device driver parameters have been stored and typically when a computer device starts or 'boots'. Initially, aspects of the present invention may receive an indication that a board device and one or more functional elements associated with the board device have been attached to an interconnect and requires a device driver. Next, aspect of the present invention retrieve device driver parameters from the storage construct and customize the adaptable device driver into a device driver for the board device in accordance with the device driver parameters specified.

DETAILED DESCRIPTION

Aspects of the present invention provide a framework for rapid design of hardware and compatible device drivers. The methodologies associated with this framework permit parallel development of device drivers and reuse of the functional blocks of code making up these device drivers. Benefits provided by aspects of the present invention include, but are not limited to, one or more of the following mentioned herein below.

One aspect of the present invention gives hardware designers a reliable way to communicate detailed aspects of the hardware design to software developers. Device driver parameters stored on-board the hardware describe crucial aspects of communicating with and controlling the hardware. A well-defined interface associated with the hardware passes the device driver parameters directly to an adaptive device driver. The adaptive device driver then incorporates the parameters becoming compatible with the hardware and obviating the need for custom programming.

Further aspects of the present invention allow reuse of the software components that make up a device driver. An adaptive device driver includes individual components that can be developed and then reused as needed by each hardware design. This facilitates a more rapid development cycle, lower overall costs and a quicker time to market. Of course, reusing device driver components also tends to produce more reliable software as the code is already known to work in other situations.

Figure 1:
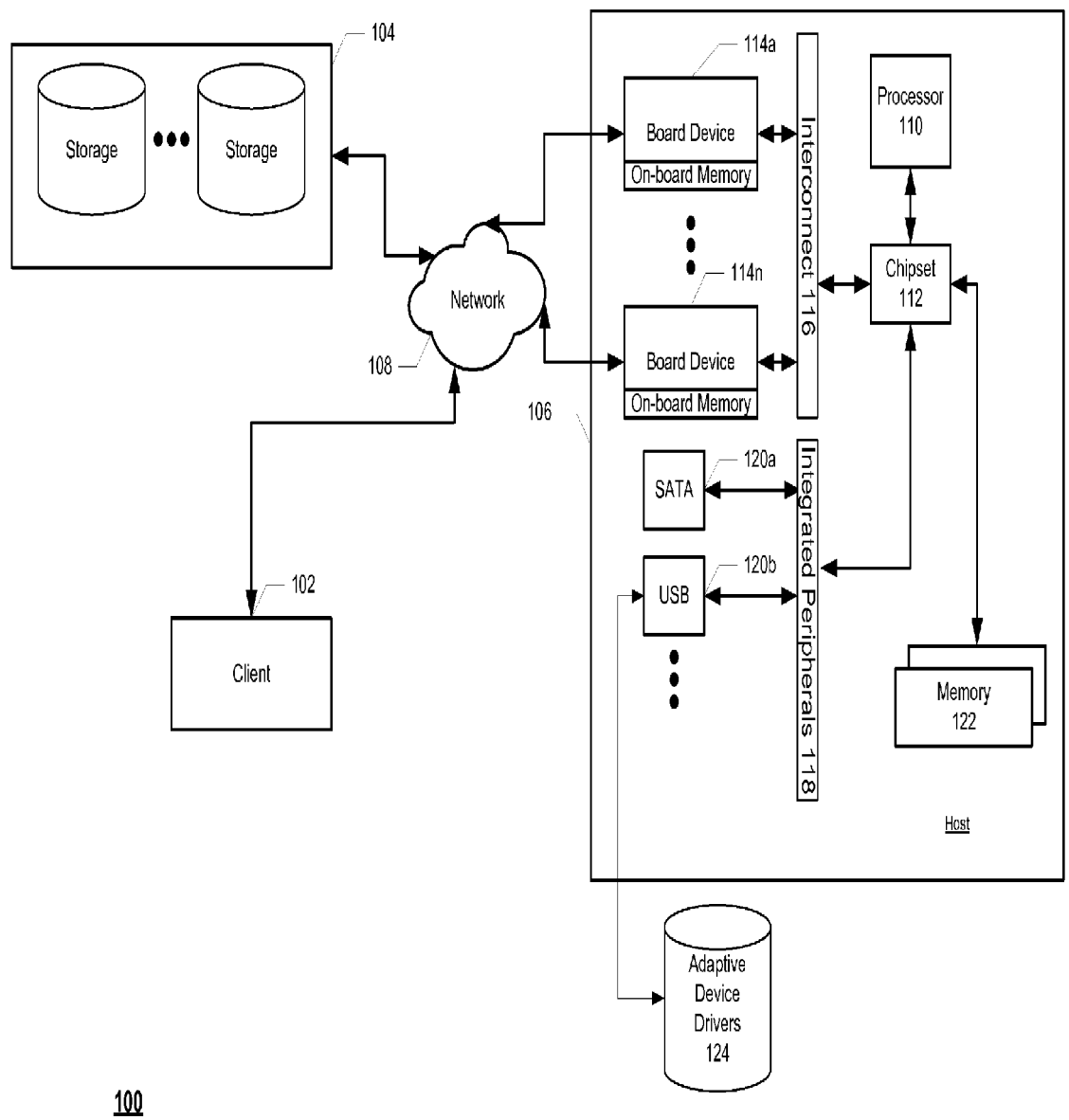
FIG. 1 is a schematic block diagram of an exemplary system providing a computing device communicating with board devices in accordance with aspects of the present invention.

Referring to FIG. 1 is a schematic block diagram of an exemplary system providing a computing device communicating with board devices in accordance with aspects of the present invention. Client 102 of system 100 in FIG. 1 communicates over network 108 with a host implemented on computing device 106 and has access to storage system 104. In this example, computer device 106 includes a processor 110, interconnect 116, integrated peripherals 118, memory 122 and a chipset 112 that provides communication support between these aforementioned components on computer device 106. Typically, chipset 112 provides higher speed support for interconnect 116 and the corresponding devices connected through this interface. Peripheral connectivity provided through SATA (serial ATA), USB (universal serial bus) or other types of connectivity may be attached through a potentially slower interface identified as integrated peripherals 118.

In one implementation, interconnect 116 may be specified as a Peripheral Component Interconnect (PCI)-Express. The PCI-Express interconnect supports a wide-range of devices illustrated as board device 114a through board device 114n. Board devices 114a through 114n generally provide a variety of additional functions to computer device 106. As an illustration, some of these functions added to computer device 106 may include a non-volatile random access memory (NVRAM) controller device, an Ethernet controller device, a fibre-channel (FC) controller device, an InfiniBand controller device, an Internet Small Computer System Interface (iSCSI) controller device, a graphic controller board device and a serial ATA controller device. However, it should be understood that aspects of the invention provide a framework for rapid development of hardware and corresponding device drivers and therefore aspects of the present invention should not limited to any particular functionality offered by any particular board device. Furthermore, while PCI-Express is a typical interconnect, it is also contemplated that aspects of the present invention could also be implemented with other technologies such as ExpressCard Interconnect, PCI interconnect, PCI eXtended (PCI-X) Interconnect and Accelerated Graphics Port (AGP) Interconnect. Moreover, aspects of the present invention could be applied to future technologies that serve a similar purpose in that they connect board devices or add-on devices to computer device 106 that need compatible device drivers.

In accordance with one implementation, a board device 114a is designed with on-board memory as illustrated. The hardware designer stores device driver parameters within the on-board memory specifying aspects of the hardware design useful to customizing adaptive device drivers. These device driver parameters are stored at a predetermined location in the on-board memory and in accordance with a particular storage construct known to the adaptive device drivers 124. The parameters are organized in discrete groupings or modules to facilitate software reusability. Unlike monolithic device driver designs, the modules making up the adaptive device driver and specified parameters are easy to work with and can readily be mixed-and-matched depending on the design.

As further described later herein, adaptive device drivers 124 are loaded into memory 122 by processor 110 upon startup/"boot" or dynamically during run-time. For example, adaptive device drivers 124 may be loaded to accommodate a new board device "hot-swapped" into interconnect 116 of computing device 106. Adaptive device drivers 124 subsequently read parameters from the predetermined location of on-board memory to obtain detailed information on the hardware design and adapt to hardware dynamically. For example, one portion of on-board memory may hold device driver parameters for the overall board device (i.e., may describe version information for the board) while another area of on-board memory may contain device driver parameters describing one or more subcomponents or functional elements on the hardware device. For example, version information may be kept separately for each functional element incorporated into the board device hardware.

In one embodiment, the storage system 104 can be file-level servers such as used in a network-attached storage (NAS) environment, block-level storage servers such as used in a storage area network (SAN) environment, or other storage systems which are capable of providing both file-level and block-level service. Further, although the storage system 104 is illustrated as a single unit in FIG. 1, it can also be implemented in a distributed architecture. For example, each storage device from storage system 104 can be implemented with multiple distributed storage servers. It can also include a physically separate network module (e.g., "N-module") and disk module (e.g., "D-module") (not shown), which communicate with other storage servers over an external interconnect.

The N-module acts as a front-end of the storage server, exporting services to clients; and the D-module acts as the back-end, managing and implementing a parity declustered distribution of a RAID organization on the underlying storage of the storage server. The N-module and D-module can be contained in separate housings and communicate with each other via network connections. Thus, the N-module and the D-module enable a storage server to be physically separated into multiple modules that can be distributed across a network. In one embodiment, storage system 104 can include multiple N-modules and D-modules, each of the N-modules corresponding to one or more D-modules, and each of the D-modules corresponding to one or more N-modules.

Computer device 106 recognizes the installation of one or more board devices such as board device 114a and determines that an adaptive device driver 124 must be customized in accordance with aspects of the present invention. Upon execution, adaptive device drivers 124 communicate over interconnect 116 using a communication protocol native to interconnect 116. One or more of the adaptive device drivers 124 receive and use device driver parameters from on-board memory of a board device to adapt to the particular hardware design.

Basic communication between adaptive device driver 124 and board device 114a may initially take place through a predetermined protocol associated with the particular interconnect 116. In the case of PCI-Express, the drivers read the device driver parameters with the help of processor 110 using memory-mapped IO also referred to as programmed input/output or PIO. Processor 110 performs memory-mapped register access on behalf of adaptive device driver 124 at a predetermined address of on-board memory of a board device. For example, one or more adaptive device drivers 124 use PIO to eventually load the device driver parameters associated with board device 114a and produce a customized device driver to work with the board device 114a. Once the adaptive device drivers 124 are customized, client 102, computing device 106 and other clients may take advantage of storage 104 and other resources made available through board devices 114a through 114n.

Figure 2:
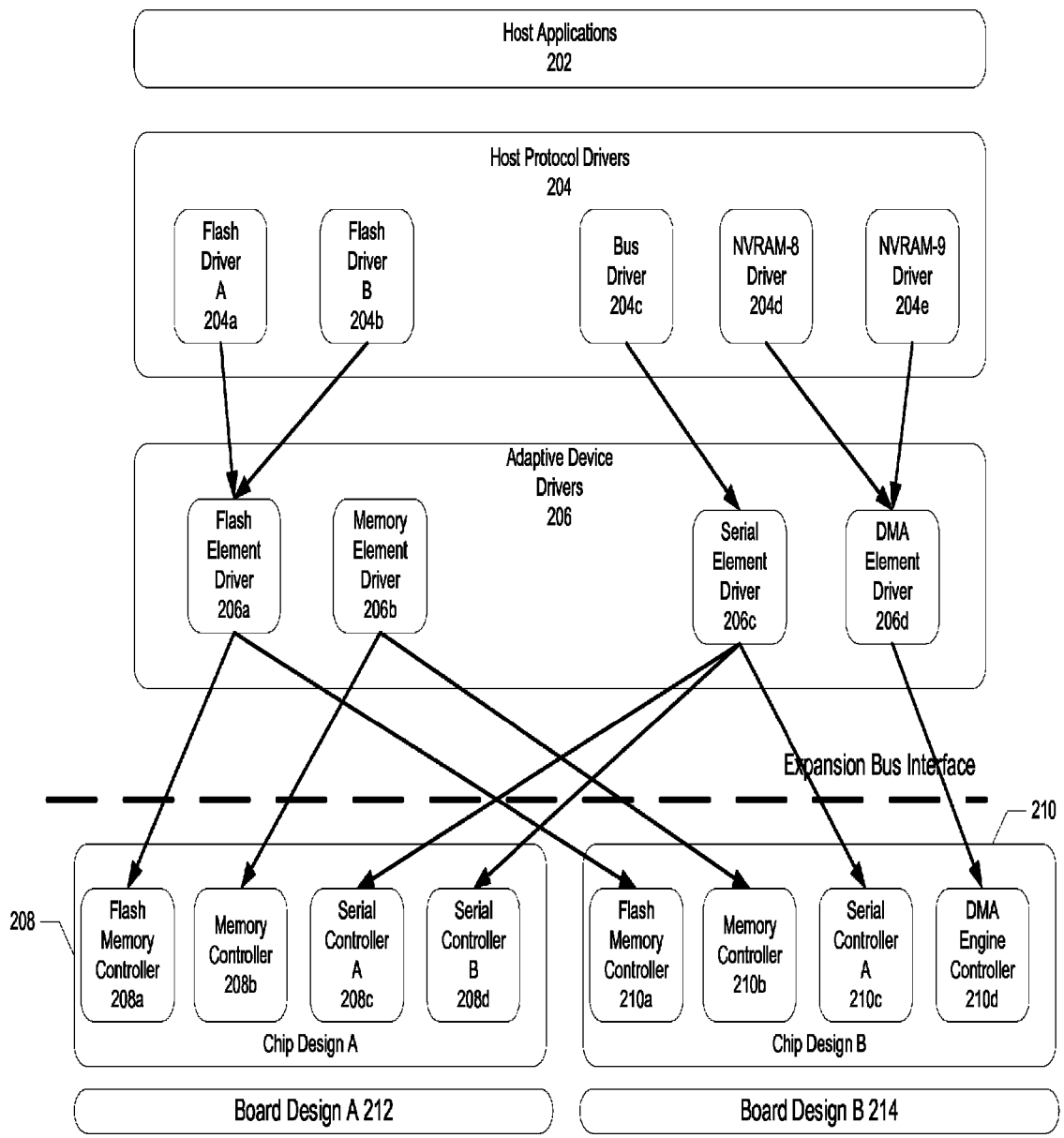
FIG. 2 is a schematic block diagram representation of drivers and hardware designed in accordance with one implementation of the present invention.

FIG. 2 is a schematic block diagram representation of drivers and hardware designed in accordance with one implementation of the present invention. In this example, components include host applications 202, host protocol drivers 204 and adaptive device drivers 206. Host applications may include an implementation of a file system such as the WAFL® (Write Anywhere File Layout) Filesystem by NetApp, Inc. or a specialized application that uses storage or other resources offered through a board device.

One of the host protocol drivers 204 typically run locally on the host device and expose an application programming interface (API) or graphical user interface (GUI) to setup configuration preferences on the underlying board devices. For example, host protocol drivers 204 depicted in FIG. 2 include flash driver 204a A, flash driver 204b B, bus driver 204c, NVRAM-8 Driver 204d and NVRAM-9 Driver 204e. These host protocol drivers 204 may in turn use adaptive device drivers 206 designed in accordance with aspects of the present invention to actually control and communicate with the underlying hardware.

Adaptive device drivers 206 may include a wide range of individual element drivers to accommodate the many different functional elements typically implemented in the hardware. The types of adaptive device drivers 206 necessary for a board design at least must match the different types of functional elements designed into the underlying board devices. For example, the types of functional element drivers may include a flash element driver 206a, a memory element driver 206b, a serial element driver 206c, a DMA element driver 206d as well as drivers for any other functional elements included in a hardware design. Each of these functional elements may be adapted to work with various hardware designs in accordance with aspects of the present invention.

In FIG. 2, flash element driver 206a can be customized to interface with specific registers used by flash memory controller 208a as well as other registers used by flash memory controller 210a. It should be appreciated that board design A 212 and board design B 214 may designed by different engineering teams, have different overall functionality and therefore use registers, memory and other resources quite differently. Flash memory controller 208a and 210a may have similar functionality but use different registers or areas of on-board memory. In one implementation, the present invention identifies these and other interface differences then passes the device driver parameters to flash driver 204a and/or flash element driver 206a. Adaptive device drivers 206 use these device driver parameters to enable a common or shared element driver, such as flash element driver 206a, to be shared even among different hardware designs. This adaptive design allows device drivers to be assembled from reusable components of the adaptive device drivers 206 and then customized according to device driver parameters included on each board device 208 or 210.

Other functional elements implemented in hardware such as memory controller 208b, serial controller A 208c, serial controller B 208d or flash memory controller 210a, memory controller 210b, serial controller 210c and DMA engine controller 210d each have a set of well-defined register interfaces in order to communicate with their respective adaptive device drivers 206. Aspects of the present invention may be used to discover many of the other features of a hardware design. Once configured, host applications 202 and host protocol drivers 204 share adaptive device drivers 206 in accordance with aspects of the present invention thus reducing development costs and development time.

Each of adaptive device drivers 206 can be used with multiple board designs and combinations of functional elements. Adaptive device drivers 206 may have a large palette of device drivers available yet selectively load and use only a small subset of the drivers as dictated by the board device.

As illustrated, adaptive device drivers 206 designed in accordance with the present invention accommodate both board design A 212 and board design B 214. For example, board design A 212 specifies one hardware design using a combination of functional elements including flash memory controller 208a, memory controller 208b, serial controller A 208c and serial controller B 208d. Another board design B 214 includes a similar combination of functional elements namely flash memory controller 210a, memory controller 210b and serial controller A 210c and uses the same core hardware designs as well as share the same adaptive device drivers 206—, namely flash element driver 206a, memory element driver 206b and serial element driver 206c. DMA Engine controller 210d is only on board design B 214 and therefore is not shared between the two board devices.

Despite any similarities, the interfaces to the same or similar functional elements used in both board design A 212 and board design B 213 may be different. The same combination of functional elements implemented on different board designs may use different registers, timing requirements, memory locations or other specifics due to different implementation designs and details. Implementations of the present invention accommodate these interface differences adaptively through device driver parameters stored within on-board memory of each board device. This ensures adaptive device drivers 206 will be customized with the proper device driver parameters when necessary. It also reduces the development time for device drivers as the hardware designers specify device driver parameters in parallel as they complete their designs.

Figure 3:
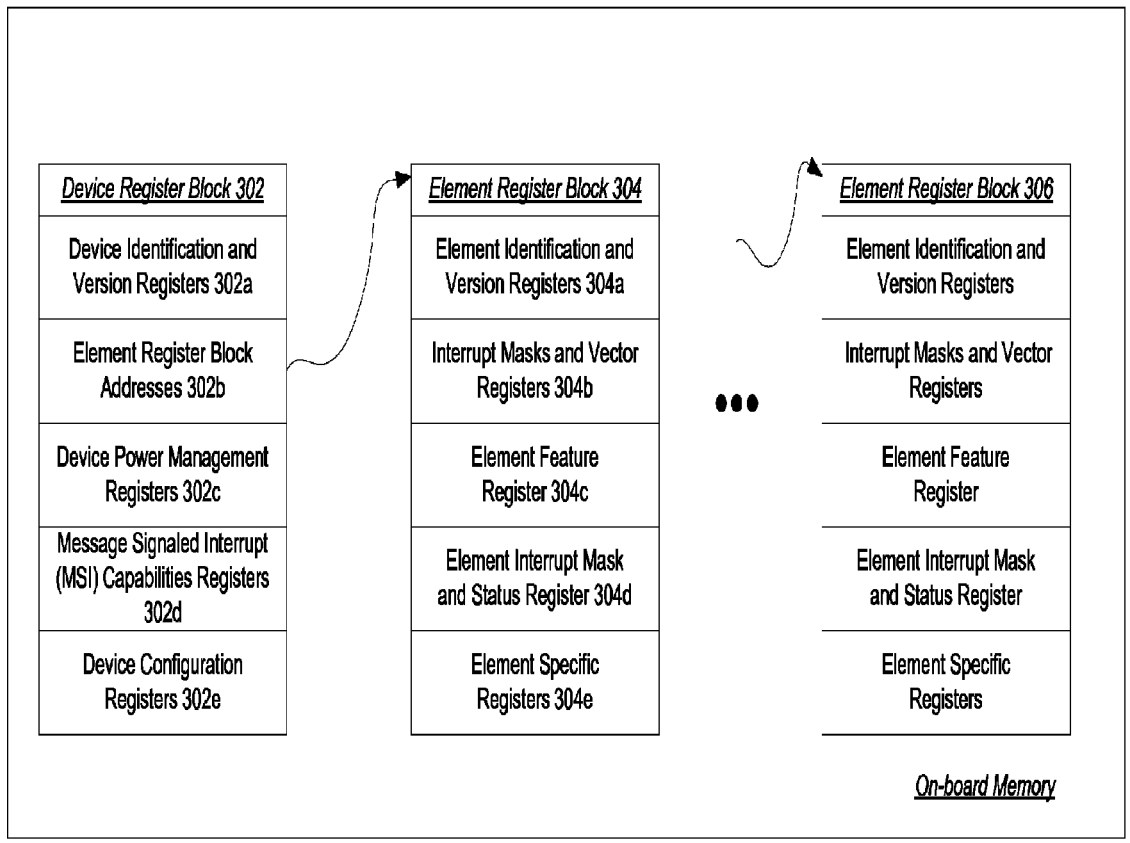
FIG. 3 is a schematic block diagram representing a storage construct having device driver parameters for a device driver in accordance with one implementation of the present invention.

Referring to FIG. 3, a block diagram illustrates the relationship between device driver parameters in a device register block and the one or more element register blocks.

In one implementation, the device register block and element register blocks represent one storage construct for organizing device driver parameters on the board devices. In general, the device register block 302 includes a set of registers and device driver parameters for customizing the adaptive device drivers. The device driver may write or read to these specific registers in order to operate or configure the overall board device. Element register blocks 304 identify registers used in operating and/or controlling specific functional elements on the board device. As previously mentioned, these functional elements may include NVRAM controllers, memory controllers and other functional elements typically reused on multiple board designs.

The registers and values in these blocks may reflect the underlying interconnect technology as the interconnect passes data between the device driver and the board device. For example, board devices implementing the PCI-Express interconnect may use the registers and device driver parameters that follow the PCI-Express protocols. In one implementation, device register block 302 includes device identification and version registers 302a. The device identification may include a PCI vendor identifier assigned by the PCI-SIG (special interest group) to identify the manufacturer and a PCI device ID to identify the particular device. Version registers 302a track the versions of the board device and possibly compatible adaptive device drivers. The versioning information helps facilitate compatibility between the various hardware and software components.

Device power management registers 302c in Device Register Block 302 are a set of registers used to perform power management functions on the board device. Power management capabilities enable discovery, control and monitoring status for a PCI compatible board device. Monitoring status for a PCI device may also include checking on power states and power state transitions. Further details on power management capabilities for PCI may be found in the PCI Bus Power Management Interface Specification Version 1.2 incorporated by reference herein for all purposes and available at www.pcisig.com.

Message signaled interrupt (MSI) featured in PCI and PCI-Express provide an alternate mechanism for generating conventional pin-based interrupts. Instead of asserting an interrupt pin on the interconnect, MSI sends an interrupt number to identify the interrupt via direct memory access (DMA) into a memory location. Accordingly, MSI capabilities registers 302d concerns the identification of devices capable of sending Message Signaled Interrupt (MSI). It is contemplated that a device may support a single or multiple MSI interrupt vectors as necessary and the MSI may be associated with other interconnects other than PCI or PCI-Express.

Device configuration registers 302e is at set of registers used to identify and configure each of the board devices coupled to the computer device. These registers may be used to convey a slot location of each board device, an identifier used to reference each device, an interrupt vector used by the device, timing latency characteristics of a device, payload sizes, read request sizes and many other characteristics associated with each board device. In the case of PCI or PCI-Express, a number of these configuration registers may further describe more detailed operational parameters that a hardware designer may select while maintaining compatibility within the range of acceptable values prescribed by the PCI standard.

Aspects of the present invention also specify a predetermined set of registers for each of the functional elements implemented on the board device. For example, the adaptive device drivers may reference a predetermined location from on-board memory such as an element register block addresses 302b. For example, one predetermined storage location in memory could be the region of on-board memory from the PCI board device identified as base address region 0 or BAR 0.

In one implementation, this predetermined storage location may lead to a linked list set of registers for each of the one or more functional element used by the board device. Element register block addresses 302b points to a first element register block 304 and potentially one or more subsequent element register blocks leading up to element register block 306. Each element register block holds device driver parameters that reflect different characteristics associated with individual functional element.

In the example in FIG. 3, element register block 304 includes element identification and version registers 304a. The header of element register block 304 begins with element identification to identify each element but also may include version numbers and the associated build date for the version. Version information is important to aspects of the present invention in order to keep the development of the hardware and the device drivers in synchronization with each other.

Interrupt masks & vector registers 304b concerns the handling of interrupts for the board device. Masking of interrupts allows the interrupts for each device to be selectively ignored as needed for orderly processing by the device drivers or other applications. In this context, the values in the one or more MSI vector registers specify a mapping of interrupt bits from an interrupt mirror register to MSI vector values.

Element feature register 304c includes a list of features for a functional element useful to the adaptable device driver. This information may include a vendor-defined element identifier as well as a pointer to the next element register block in the sequence, if any. Each feature associated with the element includes a feature id for identification of the feature; a feature version to track the version information as well as feature specific information to further describe details of the particular feature.

Element interrupt mask and status register 304d concerns management of the interrupts at the functional element level. The interrupt mask may be configured to ignore certain interrupts generated by the associated functional element. Status bits in an element interrupt status register reflects those pending element interrupts that need servicing by the device driver. In one implementation, a device driver may write to the status register to clear interrupts once the pending element interrupt has been processed.

Element specific registers 304e lists any feature specific to a particular functional element design. These registers facilitate creating an entire description of the particular functional element without reference to other elements on the board design. Generally, this allows even further customization of the drivers for one or more functional elements.

Figure 4:
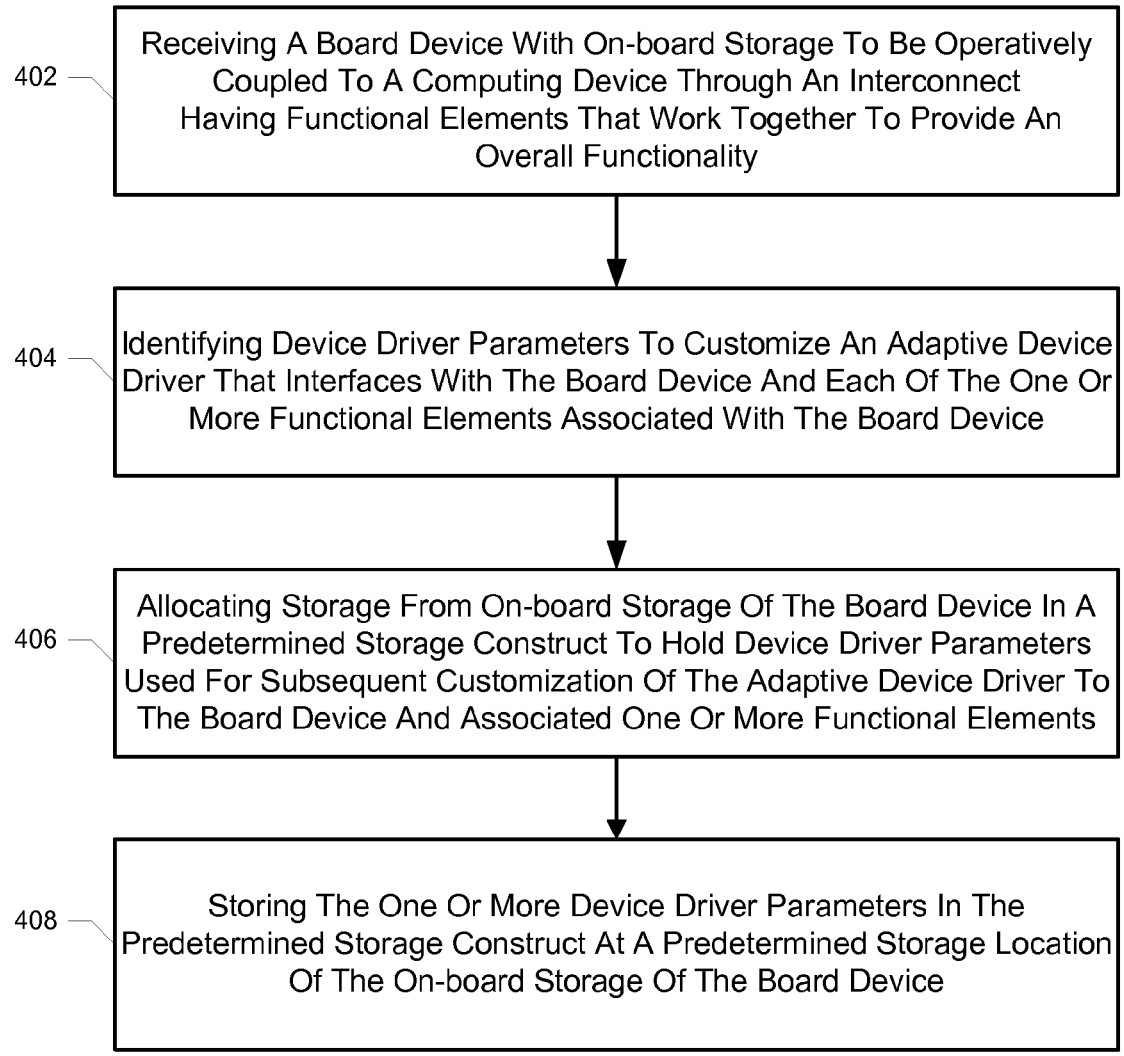
FIG. 4 is a flowchart diagram of the operations used for specifying a device driver design using on-board storage of a board device in accordance with one implementation of the present invention.

FIG. 4 is a flowchart diagram for specifying a device driver design for a board device in accordance with one implementation of the present invention. A board device to be coupled to a computer device through an interconnect is identified as having functional elements and on-board storage (400). Functional elements typically provide certain discrete hardware functions used across a wide range of board devices. Reusing these functional elements in hardware saves development and test time. Reliability improves as the reused hardware designs have already been verified as working in other designs. On-board storage allows the board device to hold device driver parameters and have a self-contained solution that stays with the hardware board device.

Next, aspects of the present invention identifies device driver parameters suited for adapting a device driver to an interface associated with each of the one or more functional elements on the board device (404). In one implementation, the board device and functional elements are implemented using a field programming gate array or FPGA. Access to specialized registers associated with different functional elements may be used to gather information or configure functional elements on the board device. Accordingly, aspects of the present invention identify a set of device driver parameters and registers that a device driver may use for gathering information or controlling the functional elements.

Once the device driver parameters are identified, aspects of the present invention allocates storage from on-board memory on the board device in a predetermined storage construct (406). It is important for both the adaptive device driver and board device to be aware of the storage construct.

This enables the board device to store the device driver data in a compact area awaiting a request. The storage construct divides memory from the board device into logical pieces large enough to hold the one or more device driver parameters. These device driver parameters are initially stored on the board device but later used during a subsequent adaptation of the device driver to the board device and associated one or more functional elements.

The next step is to store the one or more device driver parameters as organized by the predetermined storage construct at a predetermined storage location of the on-board storage of the board device (408). This gathers the various device driver parameters and loads then into storage on-board the board device.

Figure 5:
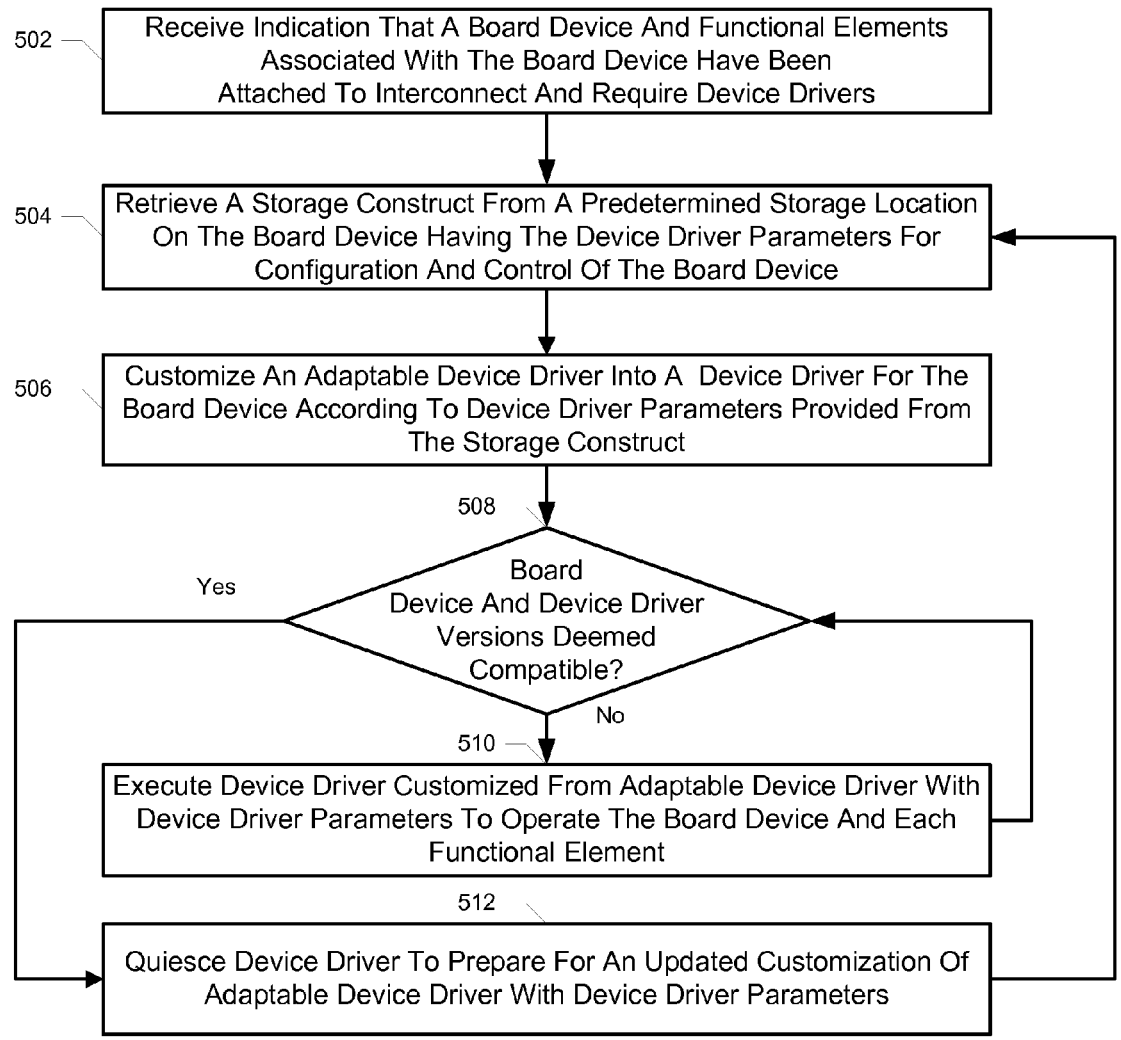
FIG. 5 is another flowchart diagram of the operations used to customize an adaptive driver using the device driver parameters specified on-board the hardware in accordance with one implementation of the present invention.

FIG. 5 is a flowchart diagram associated with customizing an adaptive device driver to a hardware design in accordance with aspects of the present invention. In one implementation, the hardware design is a board device attached to a computer device using an interconnect such as PCI-Express. Aspects of the present invention receive an indication that a board device and functional elements associated with the board device have been attached to an interconnect and require device drivers (502). This indication generally occurs automatically occur when the board devices is detected by a computer device. For example, a PCI-Express interconnect may enumerate each PCI slot when the computer device boots and discover that a device driver adapted to the board device does not exist. Device drivers may also be required when a newer version of a device driver is available or when the current version of a device driver is no longer considered compatible with the version of the board device installed. It is also contemplated that the detection for a device driver can be triggered manually on-demand while a computer device is up and running or when a "hot pluggable" board device is replaced.

Next, aspects of the present invention retrieve a storage construct from a predetermined storage location on the board device with device driver parameters for configuration and control of the board device (504). In one implementation, the storage construct is organized as a set of tables identifying various aspects of the board device and specifying one or more registers for interfacing with the board device and associated functional elements that make up the board device. For example, the storage construct may include a device register block that identifies the device and version as well as provide access to one or more registers used to control and/or configure the board device. Similarly, the storage construct may further include one or more element register blocks that identify functional elements on the board device. The element register block also may provide access to one or more registers used for control and/or configure the board device through memory-mapped access principles. Details of the device driver parameters made available in one implementation of the present invention are described hereinabove with respect to FIG. 3.

These device driver parameters are then used to customize an adaptive device driver into a suitable device driver for the board device according to device driver parameters provided from the storage construct (506). The adaptive device driver generally includes software and firmware already used as a driver in other board devices. Accordingly, the adaptive device driver results in lower costs as it does not require as much development time to implement. It is also more reliable as the code and firmware has already been pre-verified as a working device driver in other board devices. In one implementation, the adaptive device driver is customized to work with the particular board device as well as one or more functional elements making up the board device. This enables the hardware designers to reuse functional elements in hardware as well as allow software developers to reuse modular drivers for various functional elements. For example, a board device implementing an NVRAM controller and a DMA controller in hardware need only specify the element driver parameters for the NVRAM functional element module and the DMA functional element module. This allows the hardware designer to create new board devices with reused functional elements and simultaneously specify the corresponding device driver parameters for the functional elements. Ensuring that the hardware design and device driver design are tightly coupled also helps improve the reliability of the overall final product.

Over time, aspects of the present invention may check if the board device and device driver versions are deemed compatible (508). This compatibility check may occur at predetermined time intervals or may be associated with events such as rebooting the computer device. The check also may occur if there is a code release while a computer device is already up and running. If the device driver is deemed not compatible for any reason, aspects of the present invention may move to replace or update device driver. To achieve this, the computer device may quiesce the device driver as preparation for an updated customization of adaptive device driver with device driver parameters (512). It is contemplated that the updated customization may include updates to the adaptive device driver, updates to the device driver parameters located on-board the board device or some combination thereof.

As long as the board device and device driver are compatible, aspects of the present invention will execute the customized device driver from the adaptive device driver with the device driver parameters. This device driver is used to operate the board device and each functional element located on the board device (512).

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. The processor may use single core, multicore or multiprocessor (MP) solutions. MP solutions have multiple individual processors coupled together communicating over an off-chip high speed bus. For example, a multicore processor may also be considered MP as it is able to handle multiple independent instruction streams and communicates using at least some on-die connections between cores located on the same die. Accordingly, it should be appreciated aspects of the present invention applies not only to processors and multiple processors but also to single core and multicore computer processor implementations.

Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Unless otherwise specified, steps of a method claim need not be performed in the order specified. The invention is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method comprising:
    receiving, by a computing device, an indication that a board device requires a device driver;
    retrieving, by the computing device, in response to the received indication, one or more device driver parameters for configuration and control of the board device;
    identifying, by the computing device, a hardware implementation of a plurality of functional elements comprising at least two of a flash element driver, a memory element driver, a serial element driver, or a DMA element driver, in the board device based on the retrieved one or more device driver parameters; and
    customizing, by the computing device, based on the identified hardware implementation of the one or more functional elements, reusable components of an adaptive device driver to be compatible with the board device, wherein the customizing further comprises modifying the one or more functional elements of the board device for each of the one or more device driver parameters in accordance with a predetermined storage location and based on a predetermined organizational sequence.

2. The method according to claim 1, further comprising:
    comparing, by the computing device, board version data for the board device to driver version data for the adaptive device driver;
    determining, by the computing device, based on the comparison between the board version data and the driver version data, when the board version data and the driver version data match; and
    sending, by the computing device, an indication that the board device requires an updated device driver when the board version data and the driver version data do not match.

3. The method according to claim 2, further comprising:
    disabling, by the computing device, the board device in preparation for retrieval of an updated version of the adaptive device driver when the board version data and the driver version data do not match.

4. The method according to claim 1, wherein the customizing further comprises:
    identifying, by the computing device, a register address associated with the board device;
    configuring, by the computing device, the register address to control the one or more functional elements of the board device; and
    incorporating, by the computing device, the register address into the adaptive device driver for the board device to be controlled by the customized adaptive device driver.

5. The method according to claim 1, wherein the retrieving the one or more device driver parameters further comprises retrieving, by the computing device, the one or more device driver parameters from the predetermined storage location in the board device.

6. The method according to claim 1, wherein the one or more device driver parameters comprises an element register interface block comprising one or more registers that interface with the one or more functional elements of the board device and specify features of each of the one or more functional elements of the board device.

7. A computing device comprising:
    a memory containing a machine readable medium comprising machine executable code having stored thereon instructions for performing a method of specifying a device driver design;
    a processor coupled to the memory, the processor configured to execute the machine executable code to cause the processor to:
        receive an indication that a board device requires a device driver;
        retrieve in response to the received indication, one or more device driver parameters for configuration and control of the board device;
        identify a hardware implementation of a plurality of functional elements comprising at least two of a flash element driver, a memory element driver, a serial element driver, or a DMA element driver, in the board device based on the retrieved one or more device driver parameters; and
        customize based on the identified hardware implementation of the one or more functional elements, reusable components of an adaptive device driver to be compatible with the board device, wherein the customizing further comprises modify the one or more functional elements of the board device for each of the one or more device driver parameters in accordance with a predetermined storage location and based on a predetermined organizational sequence.

8. The device according to claim 7, wherein the processor is further configured to execute programmed instructions, which comprise the programmed instructions stored in the memory to:

compare board version data for the board device to driver version data for the adaptive device driver;

determine, based on the comparison between the board version data and the driver version data, when the board version data and the driver version data match; and send an indication that the board device requires an updated device driver when the board version data and the driver version data do not match.

9. The device according to claim 8, wherein the processor is further configured to execute programmed instructions, which comprise the programmed instructions stored in the memory to:

disable the board device in preparation for retrieval of an updated version of the adaptive device driver when the board version data and the driver version data do not match.

10. The device according to claim 7, wherein the processor is further configured to execute programmed instructions for the customizing, which comprise the programmed instructions stored in the memory to:

identify a register address associated with the board device;

configure the register address to control the one or more functional elements of the board device; and incorporate the register address into the adaptive device driver for the board device to be controlled by the customized adaptive device driver.

11. The device according to claim 7, wherein the processor is further configured to execute programmed instructions for the retrieving, which comprise the programmed instructions stored in the memory to retrieve the one or more device driver parameters from the predetermined storage location in the board device.

12. The device according to claim 7, wherein the one or more device driver parameters comprises an element register interface block comprising one or more registers that interface with the one or more functional elements of the board device and specify features of each of the one or more functional elements of the board device.

13. A non-transitory machine readable medium having stored thereon instructions for performing a method comprising machine executable code which when executed by at least one machine, causes the machine to:

receive an indication that a board device requires a device driver;

retrieve in response to the received indication, one or more device driver parameters for configuration and control of the board device;

identify a hardware implementation of a plurality of functional elements comprising at least two of a flash element driver, a memory element driver, a serial element driver, or a DMA element driver, in the board device based on the retrieved one or more device driver parameters; and customize based on the identified hardware implementation of the one or more functional elements, reusable components of an adaptive device driver to be compatible with the board device, wherein the customizing further comprises modify the one or more functional elements, of the board device for each of the one or more device driver parameters in accordance with a predetermined storage location and based on a predetermined organizational sequence of the board device for each of the one or more device driver parameters in accordance with a predetermined storage location and based on a predetermined organizational sequence.

14. The medium according to claim 13, further having stored thereon instructions for performing a method comprising machine executable code which when executed by at least one machine causes the machine to:

compare board version data for the board device to driver version data for the adaptive device driver;

determine, based on the comparison between the board version data and the driver version data, when the board version data and the driver version data match; and send an indication that the board device requires an updated device driver when the board version data and the driver version data do not match.

15. The medium according to claim 14, further having stored thereon instructions for performing a method comprising machine executable code which when executed by at least one machine causes the machine to:

disable the board device in preparation for retrieval of an updated version of the adaptive device driver when the board version data and the driver version data do not match.

16. The medium according to claim 13, further having stored thereon instructions for performing a method comprising machine executable code for the customizing, which when executed by at least one machine causes the machine to:

identify a register address associated with the board device;

configure the register address to control the one or more functional elements of the board device; and incorporate the register address into the adaptive device driver for the board device to be controlled by the customized adaptive device driver.

17. The medium according to claim 13, further having stored thereon instructions for performing a method comprising machine executable code for the retrieving, which when executed by at least one machine causes the machine to retrieve the one or more device driver parameters from the predetermined storage location in the board device.

18. The medium according to claim 13, wherein the one or more device driver parameters comprises an element register interface block comprising one or more registers that interface with the one or more functional elements of the board device and specify features of each of the one or more functional elements of the board device.

* * * * *